US007010474B1

(12) United States Patent
Wang et al.

(10) Patent No.: US 7,010,474 B1
(45) Date of Patent: Mar. 7, 2006

(54) PERFORMANCE PREDICTOR FOR FABRICATED PARTS

(75) Inventors: Hsin-Pang Wang, Rexford, NY (US); Sreeganesh Ramaswamy, Clifton Park, NY (US); Irene Dris, Clifton Park, NY (US); Erin Marie Perry, Niskayuna, NY (US); Dongming Gao, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1016 days.

(21) Appl. No.: 09/705,572

(22) Filed: Nov. 3, 2000

(51) Int. Cl.
   *G06F 7/48* (2006.01)
(52) U.S. Cl. ............................................. 703/7; 703/9
(58) Field of Classification Search .................... 703/7, 703/9
   See application file for complete search history.

(56) References Cited

U.S. PATENT DOCUMENTS

| 5,065,336 | A |   | 11/1991 | Buchelli |
| 5,136,497 | A | * | 8/1992  | Coe et al. ........................ 700/45 |
| 5,377,116 | A | * | 12/1994 | Wayne et al. ................. 700/175 |
| 5,402,366 | A |   | 3/1995  | Kihara et al. |
| 5,557,710 | A |   | 9/1996  | Amdursky et al. |
| 6,093,211 | A |   | 7/2000  | Hamielec et al. |
| 6,259,960 | B1 | * | 7/2001 | Inokuchi ...................... 700/110 |
| 6,768,928 | B1 | * | 7/2004 | Nagasawa et al. ............ 700/98 |
| 2002/0107676 | A1 | * | 8/2002 | Davidson ...................... 703/9 |
| 2002/0156757 | A1 | * | 10/2002 | Brown ......................... 707/1 |

FOREIGN PATENT DOCUMENTS

WO    0029918    5/2000

OTHER PUBLICATIONS

XP-000557938 "An Explicit Finite Element Solution for the Forming Prediction of Continuous Fibre-Reinforced Thermoplastic Sheets", A.K. Pickett and T. Queckborner, P. Deluca and E. Haug, Coimposites Mfg., vol. 6, No. 3-4 1995, pp. 237-243.

* cited by examiner

*Primary Examiner*—Leo Picard
*Assistant Examiner*—Carlos Ortiz-Rodriguez
(74) *Attorney, Agent, or Firm*—Andrew J. Caruso; William E. Powell, III

(57) ABSTRACT

A simulation system for generating a predicted performance for fabricated parts comprises a rheological degradation database for storing rheological degradation data for associated materials, a mechanical degradation database for storing mechanical degradation data for associated materials and a computer coupled to the rheological degradation database and the mechanical degradation database for computing part performance predictions for a respective material with a predetermined geometry under predetermined processing conditions, partially based on the rheological degradation data and the mechanical degradation data.

40 Claims, 13 Drawing Sheets

PERFORMANCE PREDICTOR FOR FABRICATED PARTS

BACKGROUND

The invention relates generally to fabricated parts, and more specifically to a performance predictor for fabricated parts, typically molded parts.

Thin-walled parts have been in increasingly higher demand in recent years. Part costs have driven the trend to thinner walls. Less material and shorter cycle times have made thin-wall applications popular with cost-conscious end users.

Examples of thin-wall molded parts include not only smaller parts like cellular phones, Personal Digital Assistants (PDAs), and laptop computer housings, but also larger parts like housings for computer monitors, and parts as large as automotive instrument panels.

Two of the most expensive tasks in the development of thin-wall molding applications are the pre-production molding trials and modifications to the tooling necessary to meet end use requirements. The uncertainties in the processing window and tooling design are the result of interactions among the material properties, the thin-wall part geometry, and the part performance.

Most process and tooling designers in the plastics injection molding community understand that it is quite difficult to design an injection mold for thin-wall parts without potential cut-and-trials, but at the same time they have failed to develop a clear definition for "thin-wall" itself. Some think that if the minimum wall thickness is less than a certain value then the part is considered to be thin-wall, while others think that the ratio between the filling distance for each gate and the minimum wall thickness should be the criterion. These definitions are not wrong, but they are only partially correct. Both criteria depend too much on the size of the part being molded, and neither considers the structural requirements of the application.

Once the basic engineering mechanics associated with this challenging problem have been considered, it is found that the viscous heating, or the viscosity times the square of the shear rate, is what makes the thin-wall applications unique in the injection molding process and tooling design area. This viscous heating couples the momentum (force) and energy (temperature) balances. An increase of 10° C. to 40° C. in the resin temperature is not uncommon for thin-wall applications.

Through the definition of the shear rate, it is apparent that thin walls or fast flow rates would produce higher shear rates. However, there is another way of developing an equivalent thin-wall condition—as the instantaneous solidified layer buildup is generated during the filling stage, a thin-wall condition could develop for the case of conventional wall thickness parts with long filling distances and fairly low flow rates, which could generate these high shears.

For the case of conventional molding, there is only a weak coupling between the momentum and energy equations through the temperature-dependent viscosity. Therefore, one can solve the pressure and temperature in a sequential manner, providing the temperature field for the viscosity calculation. However, it is much more complicated in the thin-wall case where both equations are strongly coupled through the viscous heating term, which feeds the calculated shear rate in the momentum equation back to the energy equation. This full coupling phenomenon is the core technical challenge in the development of a numerical thin-wall performance predictor. Without robust numerical algorithms, it would be impossible to predict pressure, shear rate and temperature correctly in such a complex physical system and an accurate prediction of these filling parameters is a prerequisite for predicting the failure mechanism of thin-wall molded parts.

The technology does not currently exist in the commercial mold-filling analysis codes to accurately predict the behavior of thin-walled parts in terms of the pressure, shear rate and temperature, which is a prerequisite for predicting the failure behavior. The commercial codes are good at predicting the behavior of parts that have conventional wall thicknesses, but they cannot predict the behavior of thin-walled parts because, in part, they lack improved algorithms, solution coupling and stability conditions.

In recent years, much research work has been done in linking processing conditions to warpage or shrinkage behavior through numerical simulation. This work is mostly focused on predicting failure induced by shear and thermal degradation during processing by combining numerical simulation and empirical databases.

Traditionally, impact performance depends on three factors, namely, the stress state, strain rate, and temperature. For parts produced through conventional molding, a mechanical impact theory based on these three factors is sufficient to provide reliable part performance results. However, in order to ensure complete filling, the molding of thin-wall parts requires much higher injection speeds and injection pressures, which typically lie outside the range of processing parameters used in conventional molding. These thin-wall molding conditions can generate very high shear rates in the part. Due to the viscous heating effects, the temperature can rise dramatically in the high shear regions (e.g., areas near the gate). Typical temperature increases can be as large as 40° C. Because of the extremely high shear and temperature conditions that a material can experience during thin-wall molding, the resulting parts are subject to both shear degradation (i.e., high shear) and thermal degradation (i.e., viscous heating). Shear and thermal degradation could potentially turn out to be significant factors that affect the impact performance of thin-wall parts. Therefore, a robust and reliable predictive methodology for thin-wall applications should incorporate the effects of shear and thermal degradation in addition to the traditional factors such as stress state, strain rate, and temperature.

Accordingly, there is a need for an improved performance predictor for fabricated parts.

BRIEF SUMMARY

A simulation system for generating a predicted performance for fabricated parts comprises a rheological degradation database for storing rheological degradation data for associated materials, a mechanical degradation database for storing mechanical degradation data for associated materials and a computer coupled to the rheological degradation database and the mechanical degradation database for computing part performance predictions for a respective material with a predetermined geometry under predetermined processing conditions, partially based on the rheological degradation data and the mechanical degradation data.

DEFINITION SECTION

Figure 1:
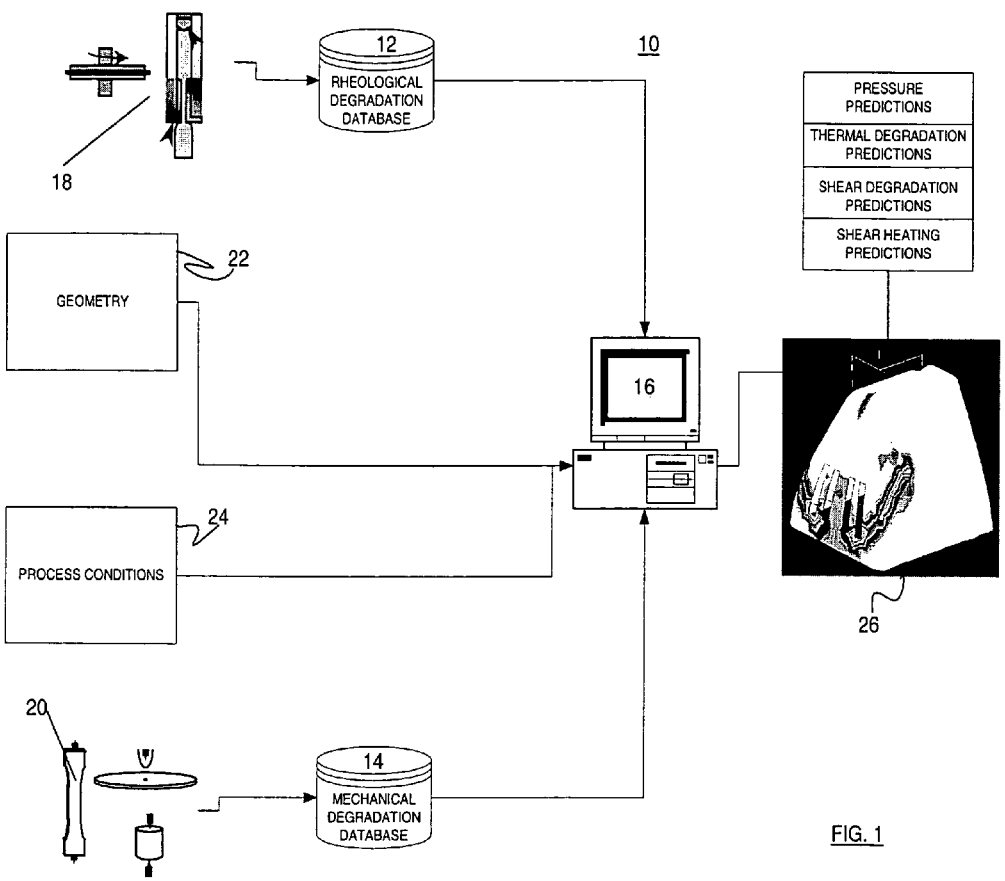
FIG. 1 is a schematic representation of a performance predictor for fabricated parts.

As used herein; the term "Computer" means a programmable device that responds to a specific set of instructions. A computer can be electronic or digital. The actual machinery, for example, wires, transistors, and circuits is called hardware and the instructions are called software. Most computers typically comprise: a memory that enables a computer to store, at least temporarily, data and programs; a mass storage device that allows a computer to permanently retain large amounts of data (common mass storage devices include disk drives and tape drives); an input device, for example, a keyboard or mouse, through which data and instructions enter a computer; an output device for example a display, screen or printer or other device that lets you see what the computer has accomplished; and a central processing unit (CPU), the component that executes instructions. In addition to these components, many other components make it possible for the basic components to work together efficiently. For example, most computers have a bus that transmits data from one part of the computer to another. Some examples of typical computers are a personal computer, a workstation, a minicomputer, multi-user computer, a mainframe, or a supercomputer.

As used herein, the term "Database" means a collection of organized data. The data is typically organized for rapid search and retrieval by a computer.

As used herein, the term "Empirical" means originating in or based on observation, experience, or testing.

As used herein, the term "Internet" means a global network of computers.

As used herein, the term "Intranet" means a secure network, typically belonging to an organization, for example, a corporation, accessible only by that organization's members, employees, or others with appropriate authorization, for storage and sharing of information.

As used herein, the term "Material" means a polymer, a metal, or a ceramic, including but not limited to silicone, polycarbonate, Cycoloy™, Lexan™, Acrylonitrile Butadiene Styrene (ABS), or magnesium, or any material used in fabricating molded parts, especially injection molded parts.

As used herein, the term "Media" means at least one of a RAM, A ROM, a disk, a DVDROM, a CDROM, an ASIC, a PROM, or any other type of storage means.

As used herein, the term "Network" means a group of two or more computers linked together. There are many types of networks, including: local-area networks (LANs), where the computers are geographically close together, typically, in the same building, and wide area networks (WANs) where the computers are farther apart and are connected by telephone lines or radio waves. In addition to these types, the following characteristics are also used to categorize different types of networks: topology is the geometric arrangement of a computer system (common topologies include a bus, a star, and a ring); the protocol defines a common set of rules and signals that computers on the network use to communicate (one of the most popular protocols for LANs is called Ethernet). Networks can be broadly classified as using either a peer-to-peer or client/server architecture. Computers on a network are sometimes called nodes. Computers and devices that allocate resources for a network are called servers.

DETAILED DESCRIPTION OF THE INVENTIONS

A simulation system 10 for generating a predicted performance for fabricated parts, typically molded parts, is depicted in FIG. 1. Simulation system 10 provides a numerical simulation tool that is able to predict a processing window for fabricating thin-walled parts, typically made by a molding process, often injection molding. Simulation system 10 links the processing conditions to the mechanical properties and failure mechanisms of the part, using empirical data developed for the rheological and mechanical degradation behavior of the material. Simulation system 10 expedites the long process development cycle time and reduces expensive tooling costs associated with thin-wall fabrication businesses.

For purposes of discussion, simulation system 10 is often discussed in terms of analysis in an injection molding process. This is one example of the application of simulation system 10 but is not a limitation. In fact, simulation system 10 can be utilized for a variety of fabrication processes using a variety of materials.

Simulation system 10 comprises a rheological degradation database 12, a mechanical degradation database 14 and a computer 16. In general, theological database 12 comprises a plurality of rheological data 18 for associated materials, typically material blends, and mechanical degradation database 14 comprises a plurality of mechanical degradation data 20 for associated materials, typically material blends. Each database 12, 14 can be stored within a database application loaded on computer 16. Alternatively, computer 16 may be coupled to databases 12, 14 via a communications system, for example, via a network, the Internet or an Intranet. In fact, both databases 12, 14 could be developed in a single database.

In operation, as discussed in greater detail below, a part geometry 22 of an object to be fabricated, typically molded, is imported into computer 16. Process conditions 24, such as filling time and inlet melt temperature are input into computer 16. Associated rheological degradation data 18 and mechanical degradation data 20 are utilized within an algorithm, as shown and discussed in FIG. 2, to generate part predictions 26 including pressure predictions, thermal degradation predictions, shear degradation predictions and shear heating predictions.

Figure 2:
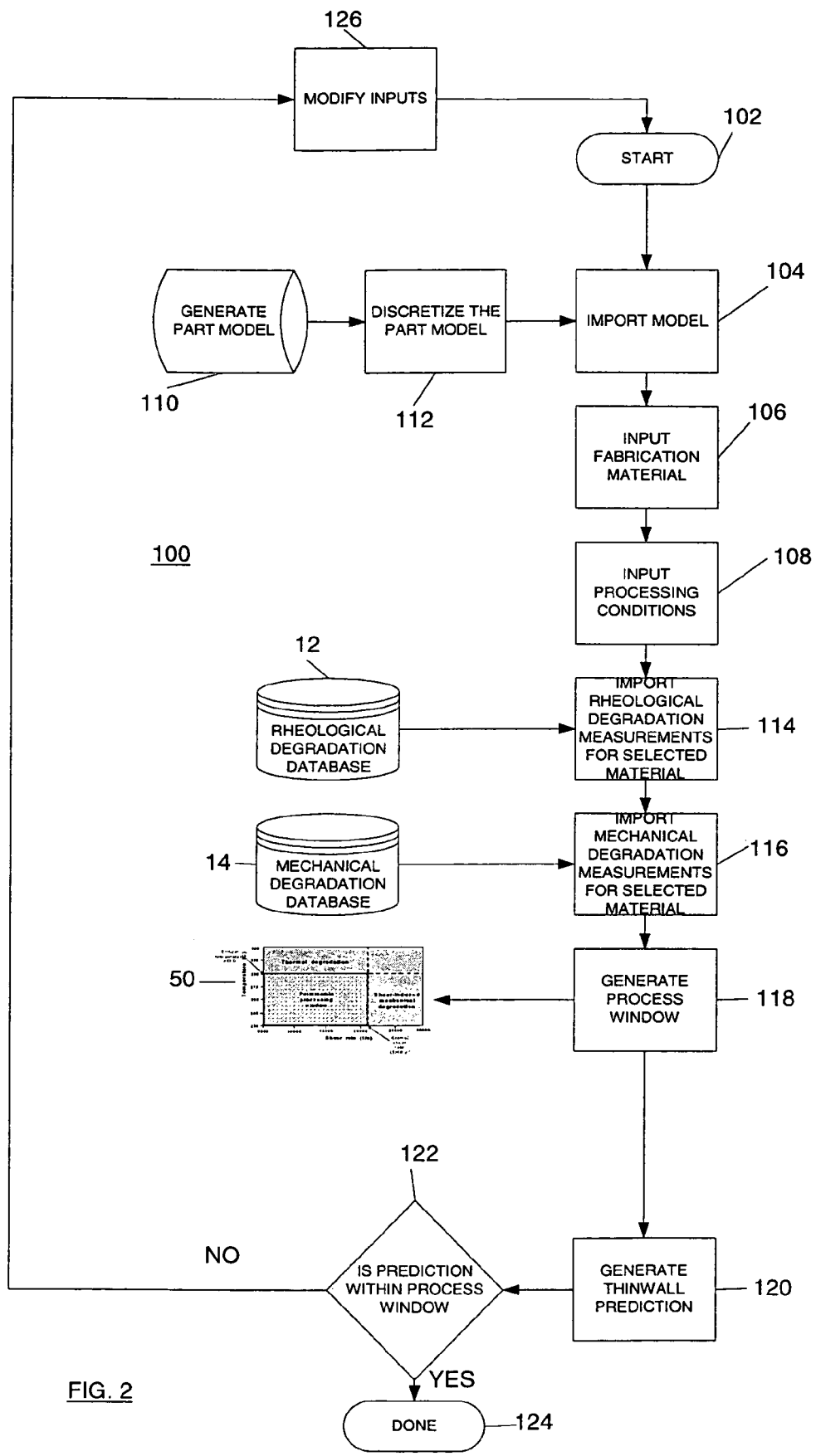
FIG. 2 is a flow chart depicting method steps in accordance with one embodiment of the instant invention.

A method for generating fabrication predictions for a part, for example, a thin-walled plastic part, is depicted in flow chart 100 of FIG. 2. In this invention, the method is embedded typically in the form of algorithms in computer 16 (FIG. 1). The algorithm can be programmed in C, C++, JAVA, Basic, MATLAB, Visual Basic, Fortran, or any other programming language.

The method described in the flow chart 100 starts at block 102 and includes three preliminary steps: importing a model 104; inputting the fabrication material 106; and inputting the processing conditions 108.

Importing a model 104 entails generating a CAD part model of a three-dimensional object 110 and discretizing the part model 112. Facets are commonly used to discretize a CAD object and can be generated by many commercially available software packages.

First as shown in block 110, a three-dimensional model of a part to be fabricated is generated, imported or loaded, typically from a standard CAD design program, for example, Unigraphics™ or ProEngineer™, within computer 16. The generated model will typically consist of surfaces or solids that define the part of interest.

Next, at block 112, the three-dimensional model is discretized, typically enveloping the model with a finite element mesh or the like. Any finite element software or graphics software capable of decomposing a 3-D surface into a mesh of triangular or otherwise shaped elements, or facets, is sufficient for generating this mesh, for example, Patran™, I-DEAS™, or Hypermesh™. Accordingly, the part model is defined as a discretized geometric representation consisting of facets on the part model surface. The smaller the size of each facet, the more accurate modeling will be. Finally, the discretized model is imported into simulation system 10 at block 104.

Next, at block 106, a fabrication material is selected or inputted, typically by a system user. The material selected or inputted is a material having associated rheological and mechanical data 18, 20 within rheological and mechanical degradation databases 12, 14.

Next, at block 108, processing conditions are input, typically by a system user. An example of processing conditions for an injection-molding process are fill time/flow rate, mold temperature and resin melt temperature.

Next, at block 114, rheological degradation data 18 associated with the selected material are imported into simulation system 10 from rheological degradation database 12.

At block 116, mechanical degradation data 20 associated with the selected material are imported into simulation system 10 from mechanical degradation database 14.

A process window 50 is generated at block 118 by computer 16 using mechanical degradation data 20 and rheological degradation data 18.

At block 120, a thin-wall prediction is made. At block 122, computer 16 compares the thin-wall prediction to process window 50. If the prediction falls within process window 50, the simulation is complete and the part design is acceptable and the process is terminated at block 124. If, however, the prediction falls outside of process window 50, the part design or the processing conditions are unacceptable and the process advances to block 126 where the inputs are modified and the process starts again at block 102.

Figure 3:
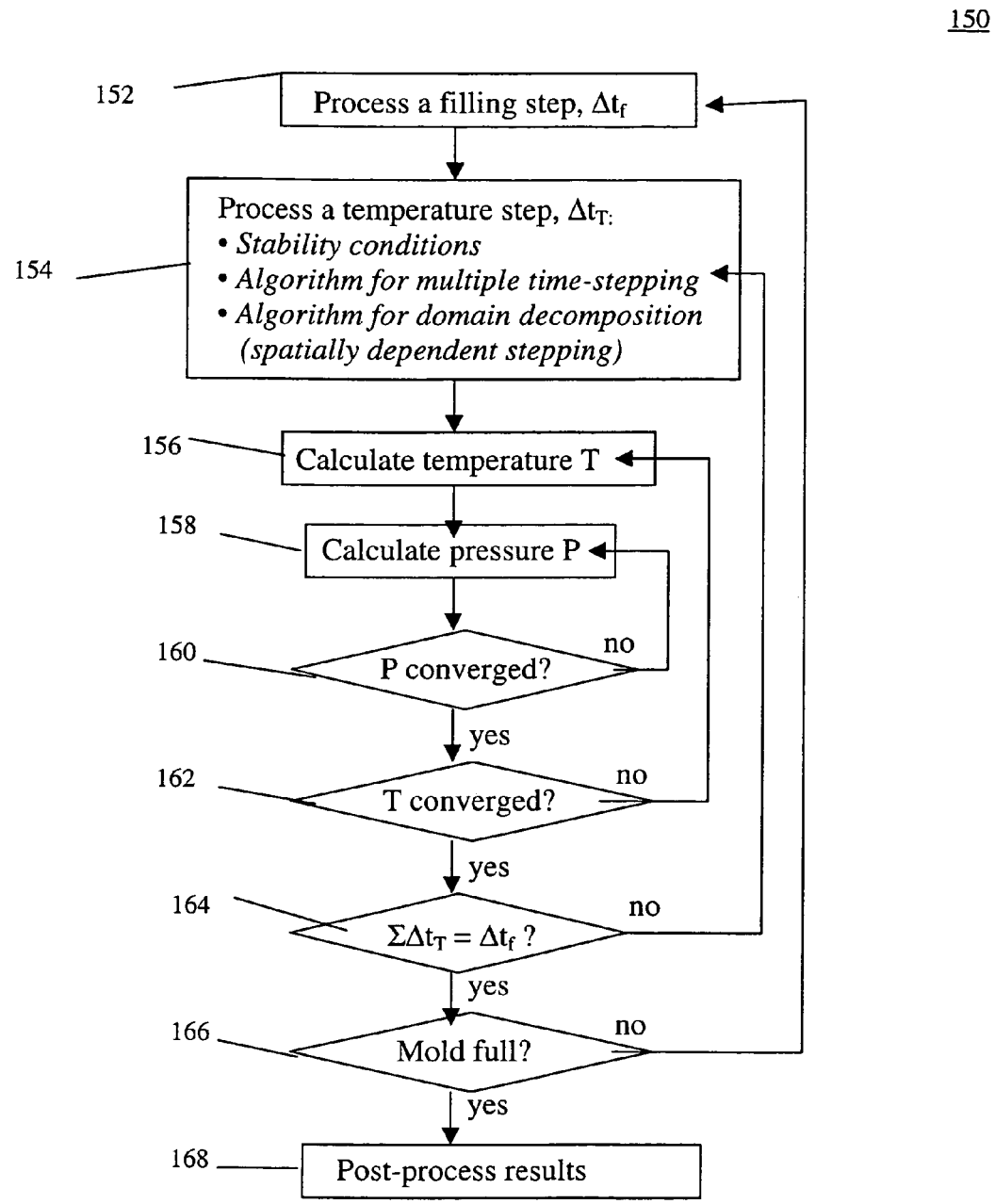
FIG. 3 is a flow chart depicting method steps in accordance with one embodiment of a thin-wall prediction algorithm.

Generating the thinwall prediction at block 120 in FIG. 2 is further detailed in the flowchart 150 in FIG. 3. In order to accurately predict the pressure, shear rate and temperature in thin-walled parts, which is a prerequisite for predicting the failure behavior, the following unique, robust numerical algorithms have been developed and embedded in the mold filling analysis portion of this performance predictor. First, filling step of size $\Delta t_f$ is processed at block 152. Next, a temperature step of size $\Delta t_T$ is processed at block 154. The size of these time steps is determined based on the following advanced numerical algorithms. Since there is no time-dependency term in the momentum equation for low inertia problems such as injection molding, there is no stability criterion needed to solve this equation. The filling time step must only be kept small enough so that the code can differentiate the filling time for each node in the finite element mesh that represents a part geometry. For the transient energy equations, however, comprehensive numerical stability conditions for the conductive, convective, and viscous heating terms must be developed and embedded in the code, in order to avoid unstable solutions.

For the conductive and convective terms, the time step size, $\Delta t$, is represented as follows:

$$\Delta t \leq \frac{1}{\frac{2\alpha}{(\Delta z)^2} + \frac{v_x}{\Delta x} + \frac{v_y}{\Delta y}} \quad (1)$$

For the viscous heating term, this time step is represented as follows:

$$\Delta t \leq \frac{\rho C_P}{|AC\dot{\gamma}^{B+2}e^{CT}|} \quad (2)$$

where
α is the thermal diffusivity
Δz is the mesh size in the thickness (or z) direction
$v_x$ is the velocity in the x flow direction
Δx is the mesh size in the x flow direction
$v_y$ is the velocity in the y flow direction
Δy is the mesh size in the y flow direction
ρ is the density
$C_p$ is the specific heat
A, B, C are the coefficients of the Power Law viscosity model
$\dot{\gamma}$ is the shear rate
T is the resin temperature The smallest time step that is calculated based on the above equations must be selected for use during the transient calculations.

Initially, the size of the time step for the momentum equation is necessarily set to be the same as that for the temperature equation, which is the smaller of the two step sizes. However, a multiple-stepping algorithm can be used for solving these two equations in a more efficient manner, which allows different time step sizes for the two equations. Also, the time step in the energy equation is spatially dependent. Using the smallest time step to solve the temperature of the entire domain is not efficient. Therefore, a domain-decomposition technique based on a spatially dependent time stepping algorithm and a synchronization scheme between the domains can be used to further reduce the CPU time.

Returning to flowchart 150 in FIG. 3, the temperature is calculated at block 156. Next, the pressure is calculated at block 158. Another critical issue is the numerical coupling between these two solution fields—the pressure and the temperature. In addition to the usual iteration steps for handling the non-Newtonian fluid (i.e., nonlinear equations) within the pressure solver, a full coupling through iterations between the pressure and temperature solvers must be implemented. Again, convergence for the coupling must be achieved before moving to the next time step.

Convergence of the pressure is checked at block 160. If the pressure has not converged, the iterations continue at block 158. If the pressure has converged, the process continues to check the temperature convergence at block 162. If the temperature has not converged, the iterations continue at block 156. If the temperature has converged, the process continues to check whether all of the temperature steps have been solved at block 164 (since the temperature steps are smaller than the filling steps, as previously discussed). If they have not all been solved, the next temperature step is processed at block 154. If they all have been solved, the process continues to check whether the mold has been filled at block 166. If it has not been filled, the next filling step is processed at block 152. If the mold is full, the process continues to post-processing at block 168, where results are written and saved.

Without these robust numerical algorithms, including the stability conditions and the advanced solution coupling methods such as multi-stepping and domain decomposition, it would not be possible to accurately predict the thin-wall molding conditions, including the most troublesome one of all, the viscous heating phenomenon.

Rheological degradation database 12 (FIG. 2) is propagated with empirical rheological degradation data 18 for a selected material, typically through a series of tests. The rheological properties of materials used in thin-wall applications can be adversely affected by the processing conditions needed to make such parts, so it is important to develop a relationship that links the rheological performance of the materials with the thin-wall injection molding processing parameters.

Under typical thin-wall injection molding conditions, a part with a 1-mm nominal wall thickness must use a very low viscosity material under great injection pressure to fill the mold. To combat this situation molders often attempt to lower the viscosity of the material by elevating the barrel temperature by as much as 30-65° C. beyond the recommended ranges. This may result in high levels of molecular degradation of the material and subsequent part failures. In addition, since these are typically parts that were at one time designed to have a 2-3 mm nominal wall thickness, the molder is using a machine with a larger barrel capacity than necessary. In essence, the standard barrel has a capacity that is too large for the shot volume required for the thin-wall parts. As a result of this, the material residence times in the barrel are too long. This combination of the long residence time and the high temperatures being used to enhance flow causes the material to degrade even faster, in a behavior that can be classified as thermal degradation.

A second type of degradation that compounds the issue is shear degradation. The typical shear rate observed in thin-wall molding can be as high as 100,000 1/sec, due to the high injection speeds and injection pressures often needed to fill the mold. At these shear rates, irreversible molecular degradation can also occur.

Previous work has shown that the decrease in melt viscosity due to thermo-mechanical degradation occurs at lower temperatures than the observed loss in impact performance; therefore the viscosity data can be used to obtain a conservative estimate for the upper processing temperature limits of the polymeric materials.

Figure 4:
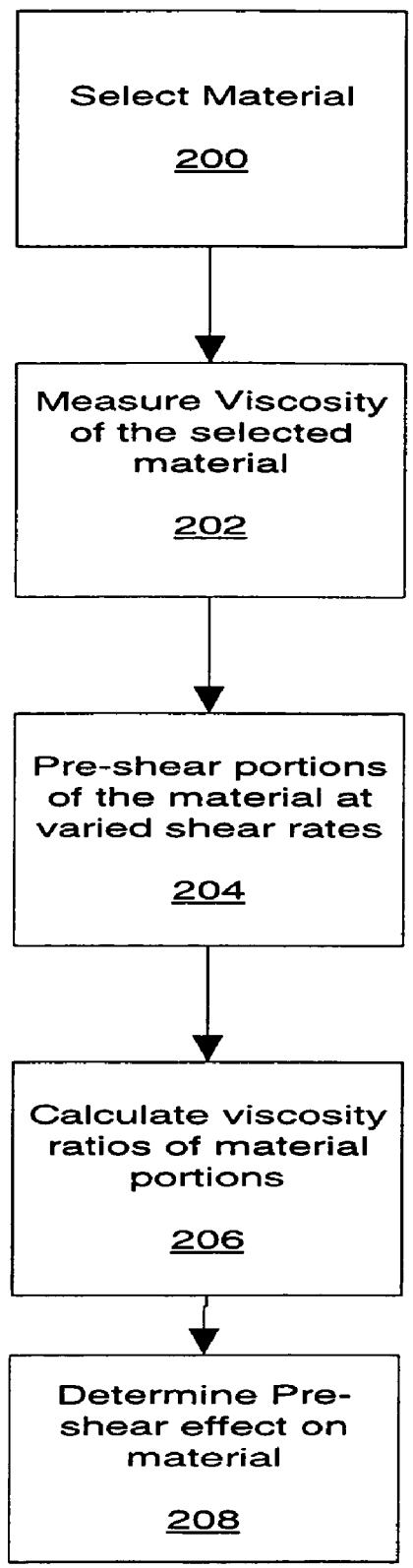
FIG. 4 is a flow chart depicting method steps in accordance with one embodiment of generating rheological data within the rheological degradation database.

A method of generating rheological data 18 for rheological degradation database 12 is shown in FIG. 4.

At block 200, a system user selects a material to test. Next, the viscosity of the selected material is measured at block 202. Viscosity of a material blend can be measured using a capillary rheometer. Next, at block 204, portions of the material are pre-sheared at various shear rates. The material can be pre-sheared by running the portions of material through the capillary rheometer at different shear rates and then measuring the viscosity of the pre-sheared material to compare with the virgin material at block 206. At block 206, the viscosity ratios of the material portions are calculated. The viscosity ratio is defined as the ratio of the viscosity of the pre-sheared material to the viscosity of the virgin material. Finally, at block 208 a determination is made about the pre-shear effect on the selected material. If the viscosity ratio of the material (over a range of shear rates) differs substantially, greater than 15%, from 1.0, the material degrades due to pre-shear effects. If the viscosity ratio does not differ substantially from 1.0, the material does not degrade due to pre-shear effects. Rheological data 18 generated from these measurements are input into rheological database 12 for the selected material.

Figure 5:
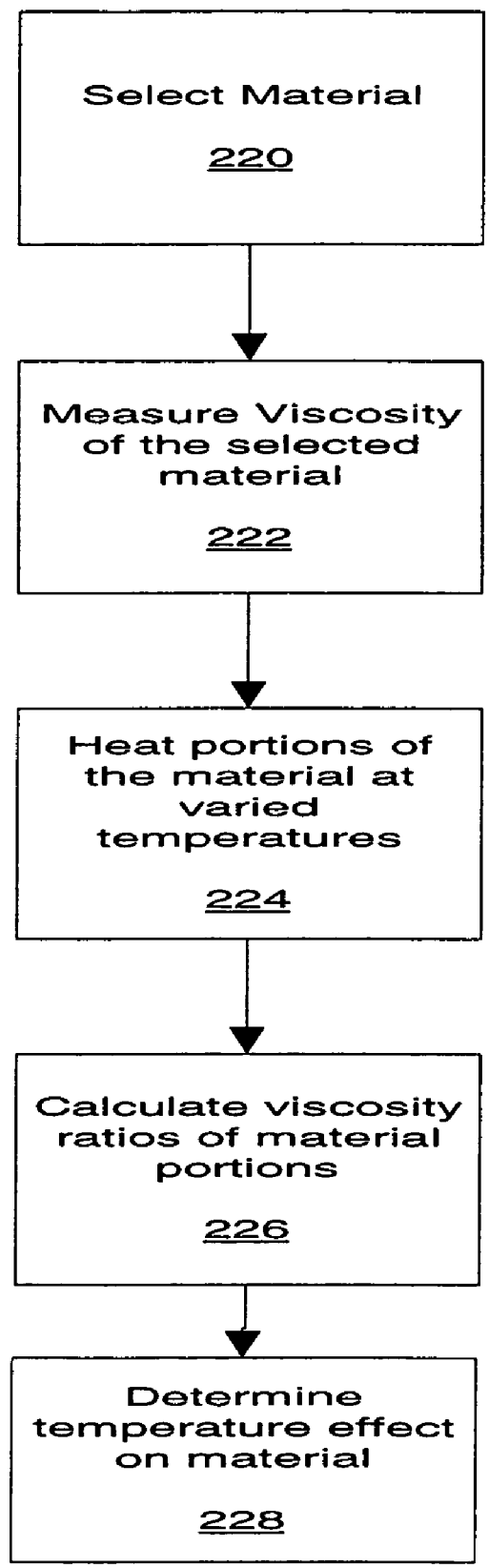
FIG. 5 is a flow chart depicting method steps in accordance with another embodiment of generating rheological data within the rheological degradation database.

A method of generating rheological data 18 for rheological degradation database 12 is shown in FIG. 5.

At block 220, a system user selects a material to test. Next, the viscosity of the selected material is measured at block 222. Viscosity of a material blend can be measured using a capillary rheometer. Next, at block 224, portions of the material are heated and held at various temperatures and then the viscosity of the heated materials are measured and compared with the viscosity of the virgin material at block 226. At block 226, the viscosity ratios of the material portions are calculated. Finally, at block 228 a determination is made about the heating effect on the selected material. If the viscosity ratio of the material (over a range of temperatures) differs substantially, greater than 15%, from 1.0, the material degrades due to temperature effects. If the viscosity ratio does not differ substantially from 1.0, the material does not degrade due to temperature effects. Rheological data 18 generated from these measurements are input into rheological database 12 for the selected material.

One test examined two PC/ABS blends, IP1000™ and MC5400™. To understand the effect of thermal degradation on the rheological performance, studies were performed in a capillary rheometer, where material is held at temperature for a specified period of time before the viscosity curve is measured. As a result, the effect of the time-temperature space on the rheological performance of the material was investigated and the thermal degradation of the material was assessed. To understand the effect of shear degradation on the material's performance, the material was pre-sheared at a high shear rate (between 8000-23,000 1/sec) and then its rheological performance was measured. This allows for the determination of a critical shear rate at which molecular degradation was observed.

Figure 6:
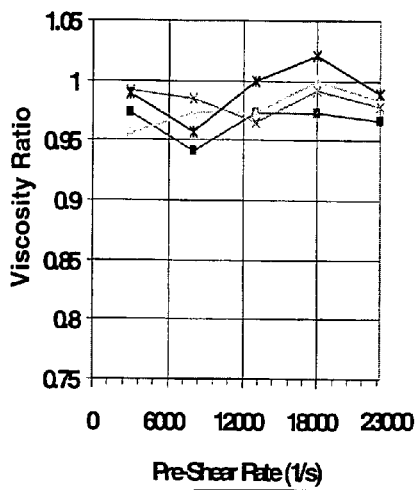
FIG. 6 is a graphical comparison of the effect of pre-shear rate and processing temperature on the viscosity ratio.
Figure 7:
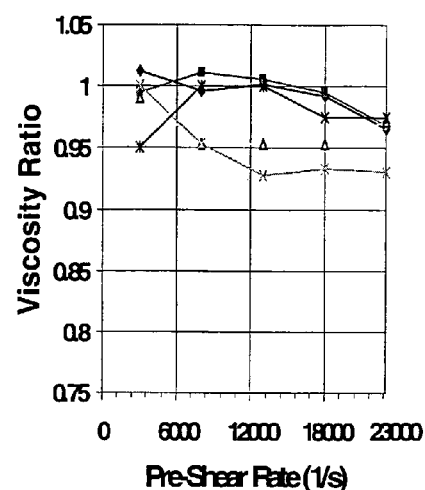
FIG. 7 is a graphical comparison of the effect of pre-shear rate and processing temperature on the viscosity ratio.
Figure 8:
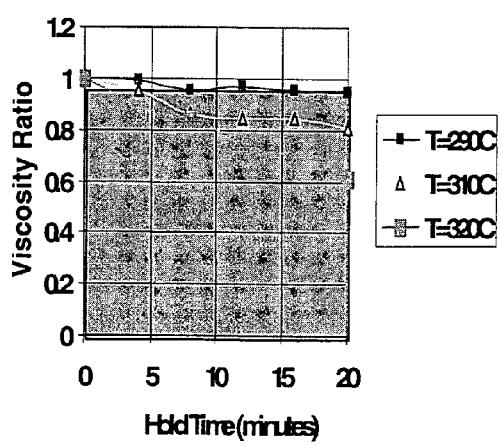
FIG. 8 is a graphical comparison of the effect of residence time and processing temperature on the viscosity ratio.
Figure 9:
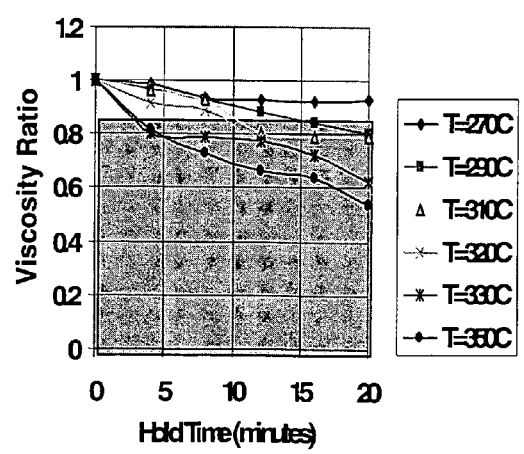
FIG. 9 is a graphical comparison of the effect of residence time and processing temperature on the viscosity ratio.

As shown by the experimental data in FIGS. 6 and 7 for the two examined blends, the viscosity is little affected by pre-shearing of the resins. The viscosity ratio, defined as the ratio of the viscosity of the pre-sheared material to the viscosity of the virgin material, does not differ substantially from 1.0. However, as seen in FIGS. 8 and 9, the viscosity is significantly affected by changes in the hold time and in the processing temperature. Therefore, for these materials, the main material degradation effect comes from thermal degradation (the combined effect of high temperatures and long residence times), while the shear degradation is a secondary effect.

Figure 10:
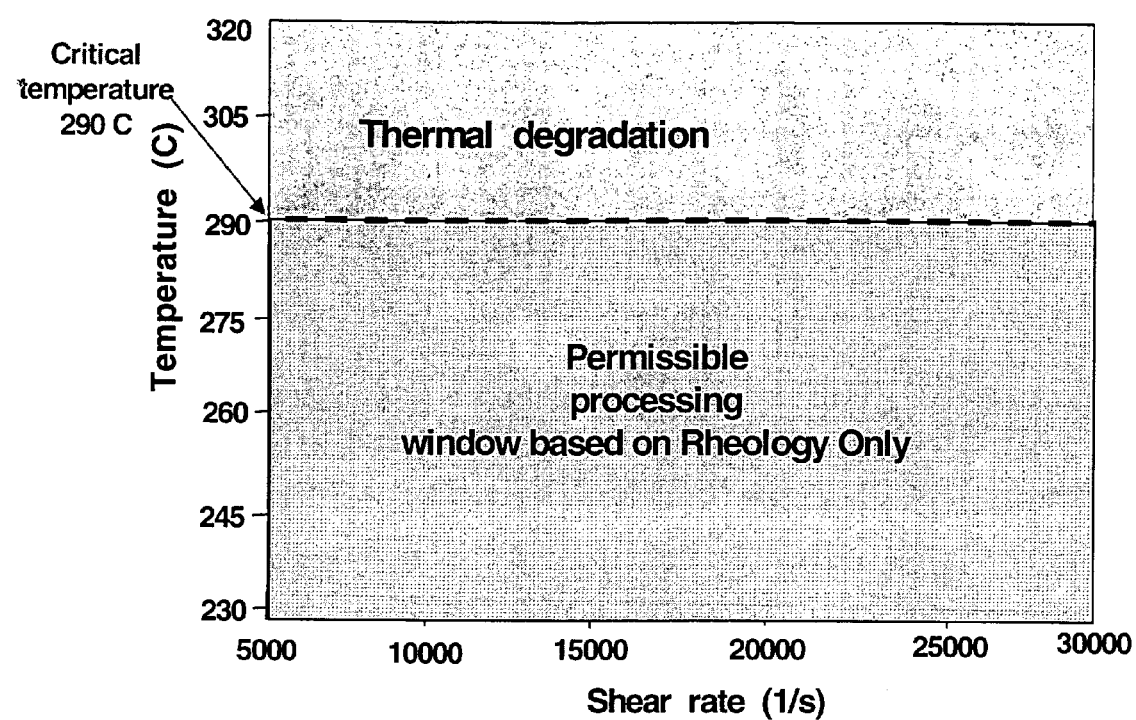
FIG. 10 is a processing window based on rheology only.

The rheological data previously discussed provides the upper limit on the thermal conditions in process window 50, which is shown in FIG. 10. For this PC/ABS blend, MC5400™, the upper limit on the processing temperature is 290° C.—above this temperature, significant thermal degradation can occur. The processing conditions must stay below this processing temperature in order to avoid material degradation. This temperature limit on the material degradation (the rheology), is recorded into rheological degradation database 12 for this material. If the material tested is affected to a greater extent by pre-shearing, process window 50 would also indicate the measured critical shear rate at which molecular degradation occurs and this would be recorded into rheological degradation database 12.

Mechanical degradation database 14 (FIG. 2) is propagated with empirical mechanical degradation data 20 for a selected material, typically through a series of tests. The mechanical properties of materials used in thin-wall applications can be adversely affected by the processing conditions needed to make such parts, so it is important to develop a relationship that links the mechanical performance of the materials with the thin-wall injection molding processing parameters.

The development of the correlation between shear and failure is based on both the impact experiments and numerical simulation of the experimental conditions. The experiments provided the failure strain while the computer simulation produced the shear rate and temperature fields, as described below.

Figure 11:
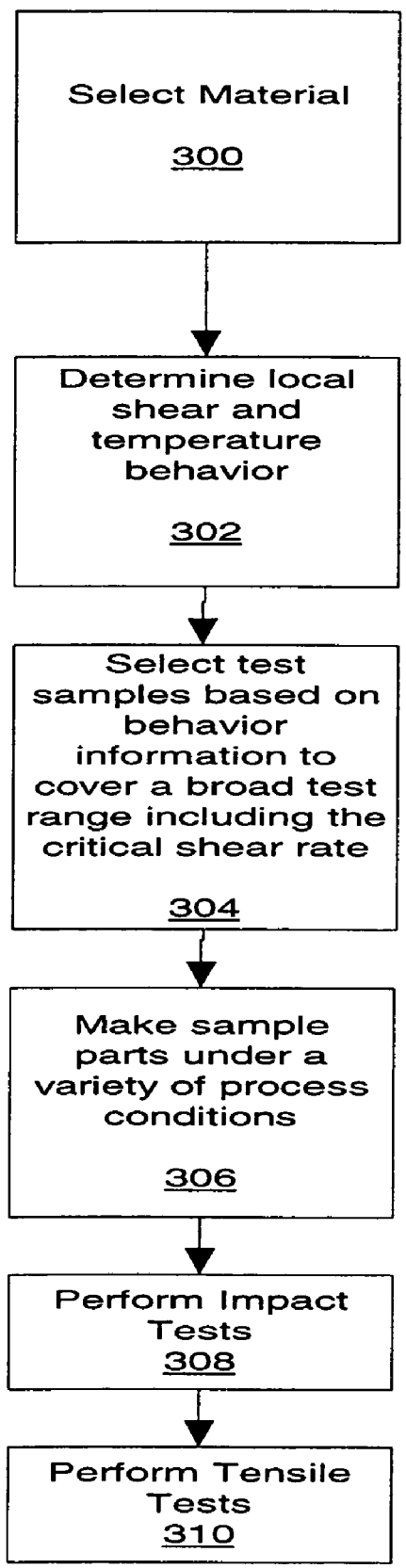
FIG. 11 is a flow chart depicting method steps in accordance with one embodiment of generating mechanical data within the mechanical degradation database.

A method of generating mechanical data 20 for mechanical degradation database 14 is shown in FIG. 11.

At block 300, a system user selects a material to test. Next, at block 302, the local shear and temperature behavior are determined. The processing parameters cannot be used to represent the local shear and thermal behavior directly, therefore, a non-isothermal mold filling analysis tool, is used to perform calculations to obtain the shear and temperature information. As previously discussed, commercial mold-filling analysis codes cannot accurately predict the pressure, shear rate and temperature for thin-walled parts. Therefore, the numerical algorithms, solution coupling and stability conditions previously discussed have been embedded in the mold-filling analysis portion of this performance predictor and are used to predict the local shear and thermal behavior in order to quantify the processing parameters. At block 304, test samples are selected based on the behavior information to cover a broad enough test range that it should include samples on either side of the critical shear rate (ductile to brittle transition point).

Next, at block 306, sample parts are made under a variety of process conditions, as determined in block 304, by changing the melt temperature, the mold temperature, the fill time and the part geometry (possibly thickness of geometry). At block 308, impact tests are performed on the sample parts. Plaques are cut from the sample parts at various regions that correspond to various shear rates. Finally at block 310, tensile tests are performed on the sample parts.

The tensile tests generate a stress-strain curve for the material and failure points are determined. Mechanical data 20 generated from these tests are input into mechanical degradation database 14 for the selected material.

Figure 12:
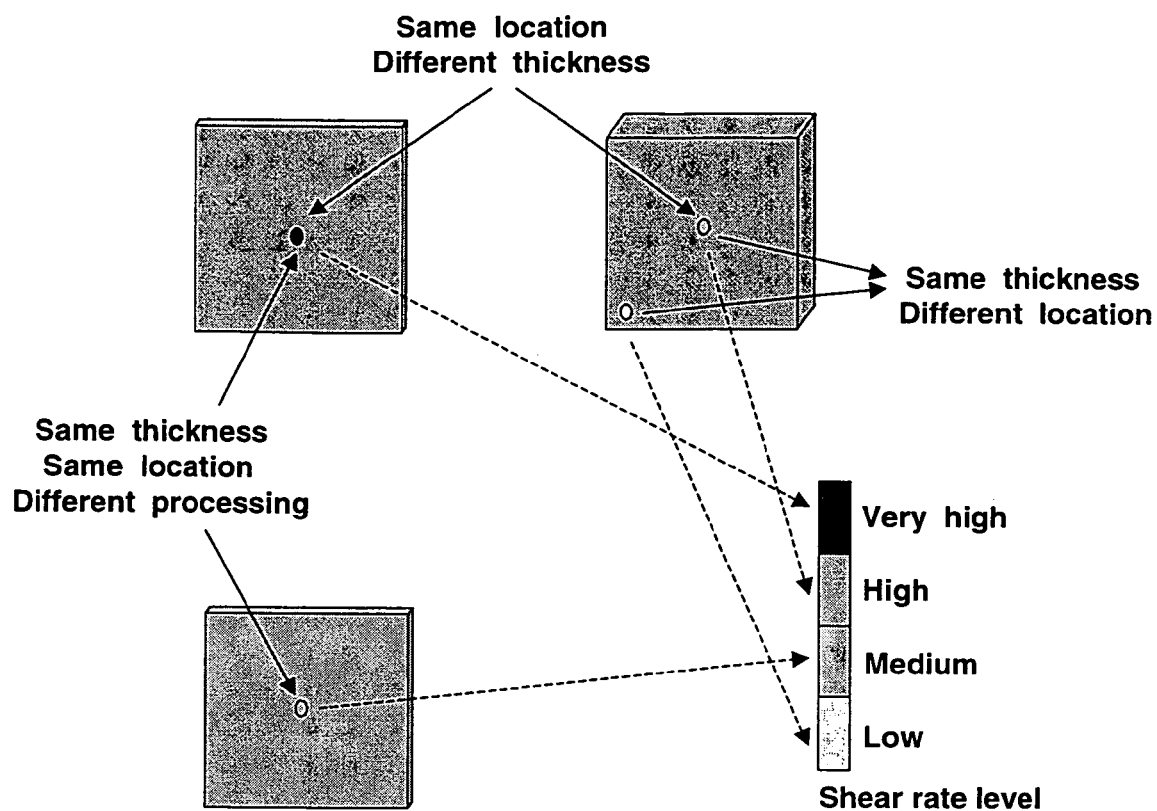
FIG. 12 is a depiction of various test plaques in accordance with one embodiment of the instant invention.
Figure 13:
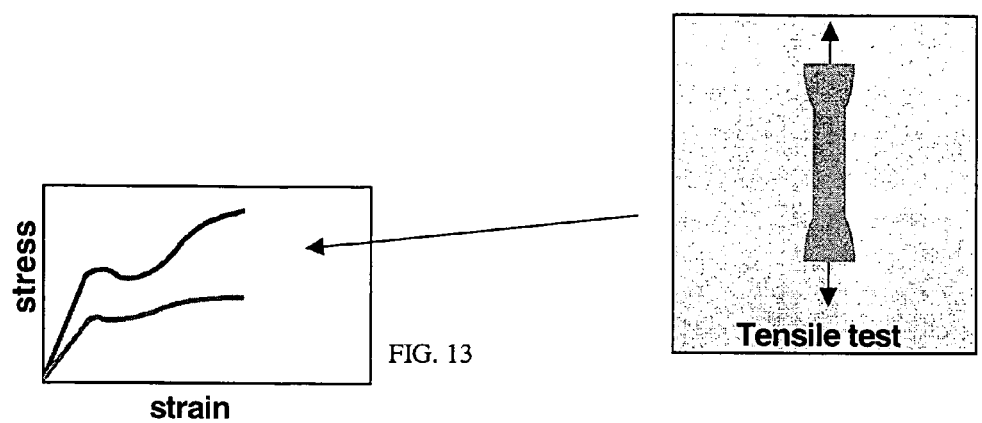
FIG. 13 is a schematic representation of a tensile test along with a resultant stress-strain curve.
Figure 14:
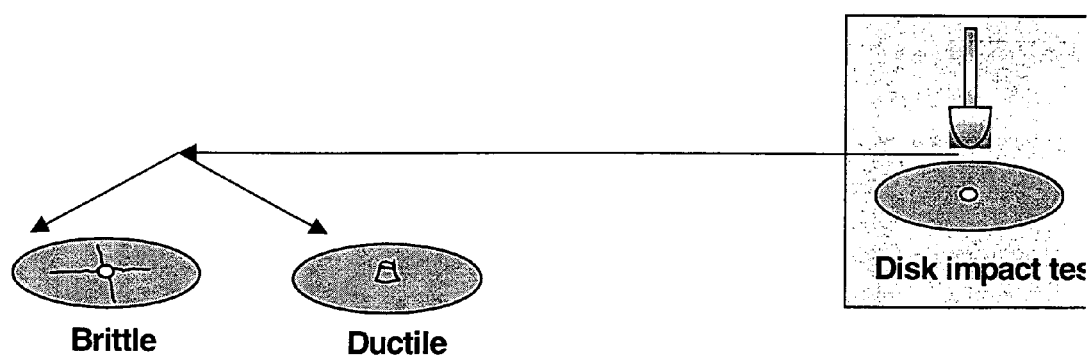
FIG. 14 is a schematic representation of an impact test along with resultant brittle and ductile failure specimens.

As shown in FIG. 12, variation in part geometry and part location results in a variation in the local shear rate. Accordingly, the tensile test portions (shown in FIG. 13) and the disk impact portions (shown in FIG. 14) of the test parts must be selected so as to account for this wide variation in local shear rate.

One test examined a CyColoy™ (PC/ABS) material, which is often used in a monitor housing applications. The melt temperature, fill (injection) time, and cooling time are the three processing parameters considered here. However, as discussed above, these processing parameters cannot be used to represent local shear and thermal behavior directly, therefore, a non-isothermal mold filling analysis tool, using the advanced numerical algorithms, solution coupling and stability conditions described previously, is used to perform calculations to obtain the shear and temperature information. A statistical Design of Experiments (DOE) technique can be employed to generate a "transfer function" that relates impact performance to this shear rate and thermal history data.

Two wall thicknesses (1 mm and 2 mm) are considered, and a total of 44 experiments (including replicates) are identified using the DOE. The availability of such a transfer function enables the design engineer to generate mechanical degradation database 14 of mechanical failure parameters using the shear rate and temperature generated by the mold filling computer simulations. It is important to realize that the effects of the processing parameters are now embedded in the entire analysis methodology.

Figure 15:
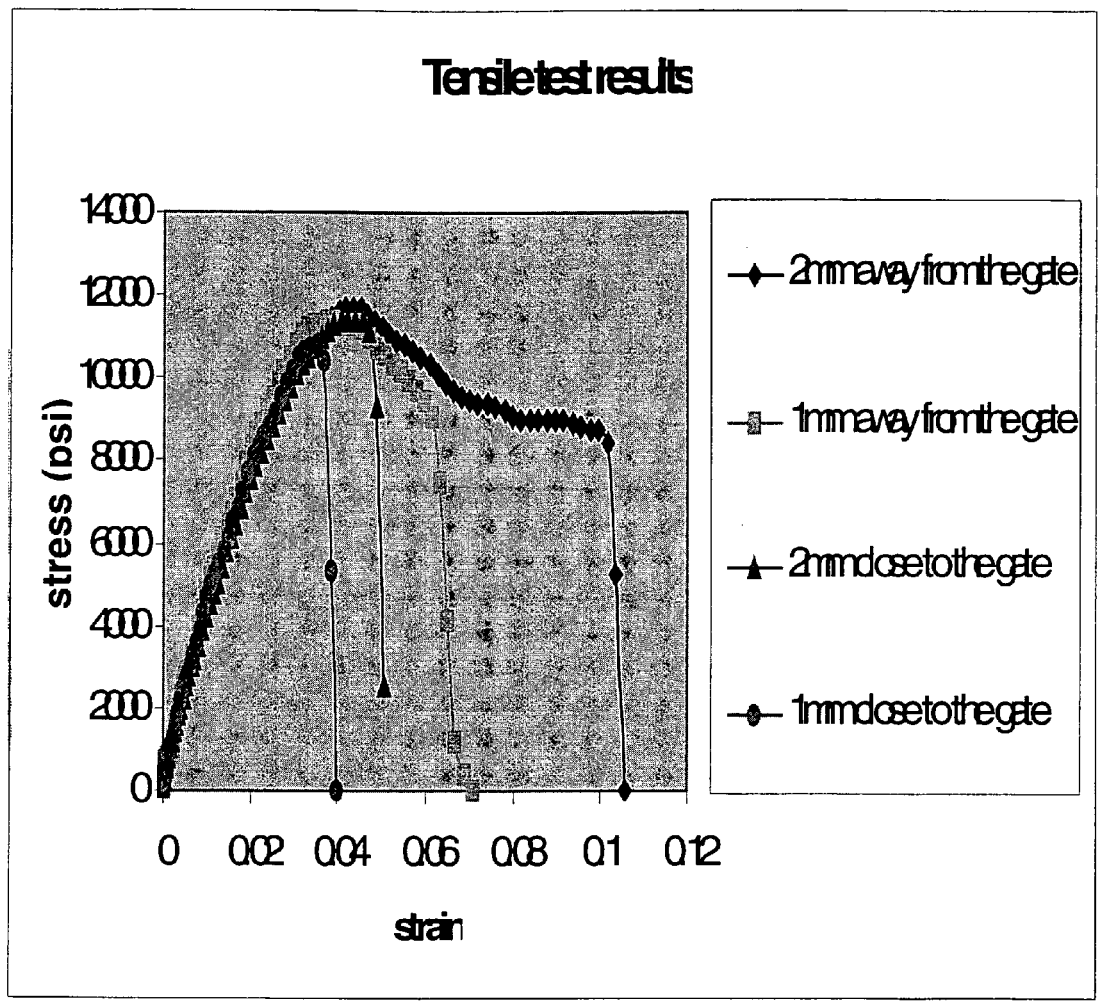
FIG. 15 is a graphical stress-strain curve representing the effects of processing on material behavior.

The experimental results for the different cases contained in FIG. 15 show that all of the curves follow the same original stress-strain path, indicating that the material properties and deformation are the same, no matter what wall thickness or what location within the part is considered. However, the termination points are different, indicating that the material failure mechanism is different depending on wall thickness and location. Therefore, processing does not influence the material properties, but it does influence the material failure mechanism.

Figure 16:
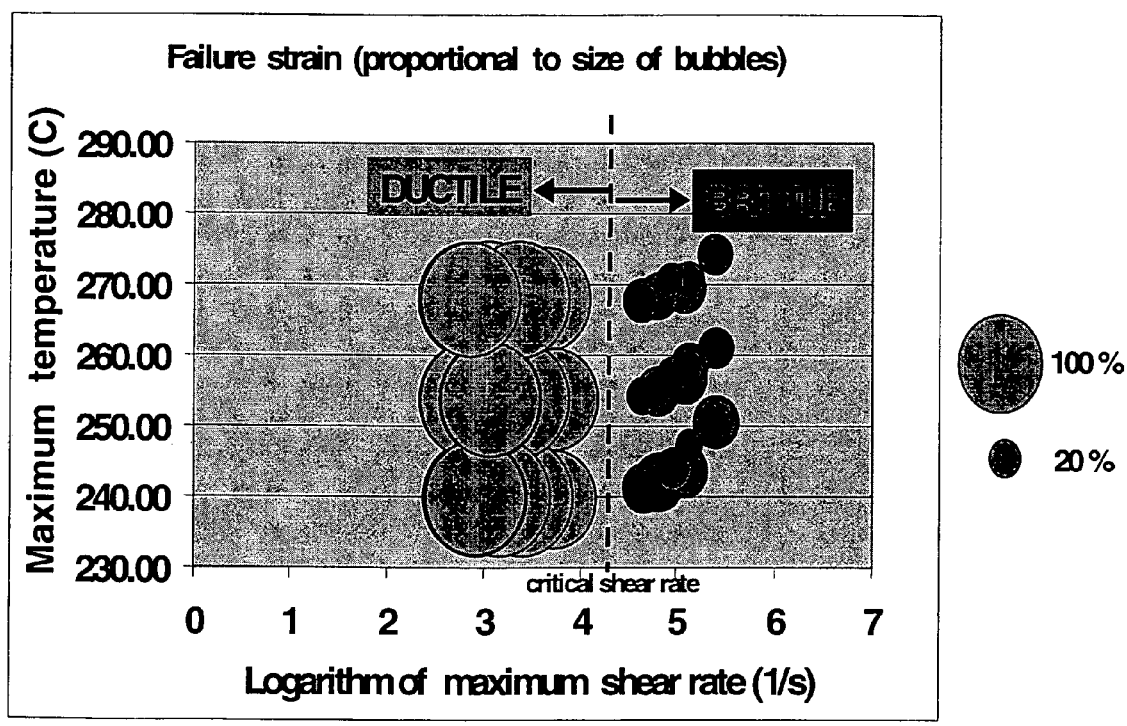
FIG. 16 is another graphical illustration representing the effects of processing on material failure.

The experimental data shows that the impact performance, or the strain rate, quickly deteriorates once the shear rate passes a critical shear value. For this PC/ABS blend, the critical shear rate is 23,000 1/sec, as shown in FIG. 16. Below the critical shear rate, the failure mechanism for parts made of this material is ductile. Beyond this critical shear rate, though, the ductile to brittle transition occurs. This important finding proves the linkage between mechanical performance and processing conditions.

Figure 17:
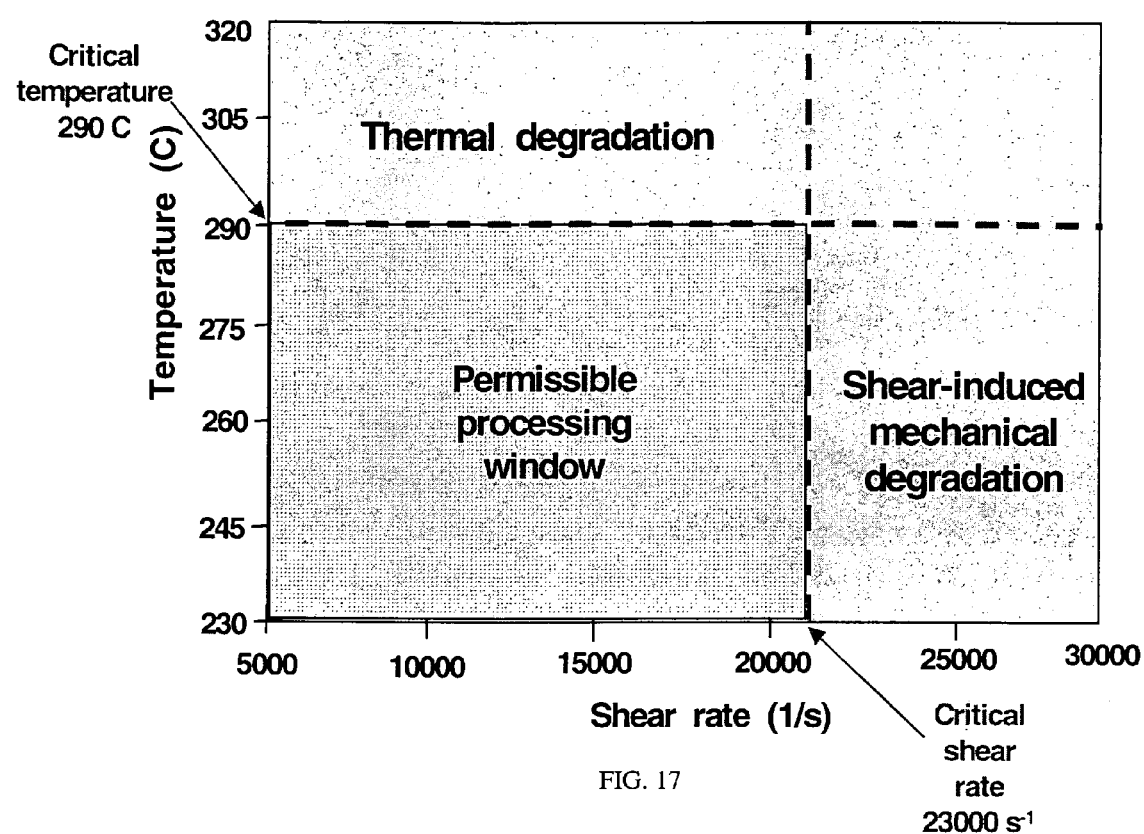
FIG. 17 is a processing window for a selected material.

The rheological data previously discussed provides the upper limit on the thermal conditions in the process window, as shown in FIG. 17. As discussed above, for this PC/ABS blend, the upper limit on the processing temperature is 290° C. As determined in FIGS. 15 and 16, the upper limit on the shear rate is 23,000 1/sec. Above this shear rate, shear-induced mechanical degradation can occur. The processing conditions must stay within the lower left region in FIG. 17 in order to avoid material degradation and brittle failures. These two limits, the shear limit on the mechanical performance (the failure strain) and the temperature limit on the material degradation (the rheology), have been incorporated in simulation system 10 (FIG. 1).

Using calculated rheological degradation data 18 and the mechanical degradation data 20 during filling, simulation system 10 can pinpoint exactly which regions would be expected to experience brittle failure for a respective part geometry and tooling design.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A simulation system for generating a predicted performance for fabricated parts comprising:
   a rheological degradation database for storing a plurality of rheological degradation data for associated materials;
   a mechanical degradation database for storing a plurality of mechanical degradation data for associated materials; and
   a computer coupled to said rheological degradation database and said mechanical degradation database for computing part performance predictions for a respective material with a predetermined geometry under predetermined processing conditions, partially based on said rheological degradation data and said mechanical degradation data;
   wherein a process window is generated by said computer using said mechanical degradation data and said rheological degradation data and a thinwall prediction in a mold is made.

2. A simulation system in accordance with claim 1, wherein said materials are selected from the group consisting of polymer, metal and ceramic.

3. A simulation system in accordance with claim 1, wherein said material is silicone.

4. A simulation system in accordance with claim 1, wherein said material is magnesium.

5. A simulation system in accordance with claim 1, wherein a part geometry of an object to be fabricated is imported into said computer.

6. A simulation system in accordance with claim 1, wherein said processing conditions include filling time, mold temperature and melt temperature.

7. A simulation system in accordance with claim 5, wherein said part geometry imported into said computer importing a model entails generating a CAD (computer aided design) part model of a three-dimensional object and discretizing the part model.

8. A simulation system in accordance with claim 7, wherein the three-dimensional model is discretized by enveloping the model with a finite element mesh.

9. A simulation system in accordance with claim 8, wherein a graphics software capable of decomposing a 3-D surface into a mesh of triangular or otherwise shaped elements, or facets, is used.

10. A simulation system in accordance with claim 1, wherein said computer compares said thin-wall prediction to said process window.

11. A simulation system in accordance with claim 10, wherein if the prediction falls within said process window, the simulation is complete and the said fabricated part is acceptable.

12. A simulation system in accordance with claim 10, wherein if said prediction falls outside of said process window said fabricated part or said processing conditions are unacceptable and said inputs need modification.

13. A simulation system in accordance with claim 1, wherein said thinwall prediction comprises a first filling step of size $\Delta t_f$ and a temperature step of size $\Delta t_T$.

14. A simulation system in accordance with claim 13, wherein for conductive and convective terms, a time step size, $\Delta t$, is defined as follows:

$$\Delta t \leq \frac{1}{\frac{2\alpha}{(\Delta z)^2} + \frac{v_x}{\Delta x} + \frac{v_y}{\Delta y}}$$

where
  $\alpha$ is the thermal diffusivity
  $\Delta z$ is the mesh size in the thickness (or z) direction
  $v_x$ is the velocity in the x flow direction
  $\Delta x$ is the mesh size in the x flow direction
  $v_y$ is the velocity in the y flow direction
  $\Delta y$ is the mesh size in the y flow direction.

15. A simulation system in accordance with claim 13, wherein for a viscous heating term, said time step is represented as follows:

$$\Delta t \leq \frac{\rho C_P}{|AC\dot{\gamma}^{B+2}e^{CT}|}$$

where,
  $\rho$ is the density
  $C_p$ is the specific heat
  A, B, C are the coefficients of the Power Law viscosity model
  $\dot{\gamma}$ is the shear rate and
  T is the resin temperature.

16. A simulation system in accordance with claim 13, wherein a temperature is calculated and a pressure is calculated.

17. A simulation system in accordance with claim 16, wherein a convergence of said pressure is monitored.

18. A simulation system in accordance with claim 17, wherein if said pressure has converged, the system monitors for temperature convergence.

19. A simulation system in accordance with claim 16, wherein a convergence of said temperature is monitored.

20. A simulation system in accordance with claim 19, wherein if the temperature has converged, the system monitors whether all of the temperature steps in said thinwall prediction have been solved.

21. A simulation system in accordance with claim 20, wherein if all of the temperature steps in said thinwall prediction have not been solved, a next temperature step is processed.

22. A simulation system in accordance with claim 21, wherein if all of the temperature steps in said thinwall prediction have been solved, the system monitors whether the mold has been filled.

23. A simulation system in accordance with claim 22, wherein if the mold has not been filled, the next filling step is processed.

24. A simulation system in accordance with claim 22, wherein if the mold is full, a post-processing is done where results are written and saved to said computer.

25. A simulation system in accordance with claim 1, wherein said rheological degradation database is propagated with empirical rheological degradation data for said selected material.

26. A simulation system in accordance with claim 25, wherein a portion of said rheological degradation database is propagated by:
 selecting a material to test;
 measuring the viscosity of said selected material;
 pre-shearing portions of said material at various shear rates;
 measuring the viscosity of said pre-sheared material;
 calculating the viscosity ratio between said pre-sheared material and said material to detect a pre-shear effect on said material.

27. A simulation system in accordance with claim 25, wherein a portion of said rheological database is generated by:
 selecting a material to test;
 measuring the viscosity of said selected material;
 heating portions of said material at various temperatures;
 measuring the viscosity of said heated portions;
 calculating the viscosity ratio between said heated material and said material to detect a temperature effect on said material.

28. A simulation system in accordance with claim 1, wherein said mechanical degradation database is propagated with empirical mechanical degradation data for said selected material.

29. A simulation system in accordance with claim 27, wherein a portion of said mechanical degradation database is generated by:
 selecting a material to test;
 computing the local shear and temperature behavior of said selected material;
 selecting test conditions based on behavior information to cover a broad test range;
 making sample parts under the selected test conditions;
 performing impact tests on said sample parts; and
 performing tensile tests on said sample parts.

30. A computer generated prediction method for generating a predicated performance for a fabricated part comprising:
 importing a model;
 inputting a fabrication material;
 inputting processing conditions;
 importing rheological degradation data for said selected material;
 importing mechanical degradation data for said selected material;
 generating a process window;
 generating a thinwall prediction; and
 comparing said thinwall prediction to said process window.

31. A method for generating a predicated performance, in accordance with claim 30, wherein said step of importing a model comprises:
 generating a part model; and
 discretizing said part model.

32. A method for generating a predicated performance, in accordance with claim 30, wherein said step of inputting fabrication material includes:
 inputting a fill time;
 inputting a mold temperature; and
 inputting a resin melt temperature.

33. A method for generating a predicated performance, in accordance with claim 30, wherein said step of inputting a fabrication material is selected from the group consisting of polymer, metal and ceramic.

34. A method for generating a predicated performance, in accordance with claim 30, wherein said step of importing rheological degradation data for said selected material comprises:
 importing said rheological degradation data from a rheological degradation database.

35. A method for generating a predicated performance, in accordance with claim 34, wherein said rheological database is generated by:
 selecting a material to test;
 measuring the viscosity of said selected material;
 heating portions of said material at various temperatures;
 measuring the viscosity of said heated portions;
 calculating a viscosity ratio between said heated material and said material to detect a temperature effect on said material.

36. A method for generating a predicated performance, in accordance with claim 30, wherein said step of importing mechanical degradation data for said selected material comprises:
 importing said mechanical degradation data from a mechanical degradation database.

37. A method for generating a predicated performance, in accordance with claim 36, wherein said mechanical database is generated by:
 selecting a material to test;
 computing the local shear and temperature behavior of said selected material;
 selecting test conditions based on behavior information to cover a broad test range;
 making sample parts under the selected test conditions;
 performing impact tests on said sample parts; and
 performing tensile tests on said sample parts.

38. Computer-readable media tangibly embodying a program of instructions executable by a computer to perform a computer generated prediction method for a fabricated part, the method comprising;
 importing a model;
 inputting a fabrication material;
 inputting processing conditions;
 importing rheological degradation data for said selected material;
 importing mechanical degradation data for said selected material;
 generating a process window;
 generating a thinwall prediction; and
 comparing said thinwall prediction to said process window.

39. Computer-readable media tangibly embodying a program of instructions in accordance with claim 38, wherein said media comprise at least one of a RAM, A ROM, a disk, a CDROM, a DVDROM, an ASIC and a PROM.

40. A computer generated prediction method of generating a predicated performance for a fabricated part, the method comprising:
 means for importing a model;
 means for inputting a fabrication material;
 means for inputting processing conditions;
 means for importing rheological degradation data for said selected material;
 means for importing mechanical degradation data for said selected material;
 means for generating a process window;
 means for generating a thinwall prediction; and
 means for comparing said thinwall prediction to said process window.

* * * * *